United States Patent [19]

Tanagawa et al.

[11] Patent Number: 4,969,087
[45] Date of Patent: Nov. 6, 1990

[54] SINGLE-CHIP MICROCOMPUTER

[75] Inventors: Kouji Tanagawa; Tomoaki Yoshida, both of Tokyo, Japan

[73] Assignee: Oki Electric Industry Co., Ltd., Tokyo, Japan

[21] Appl. No.: 116,862

[22] Filed: Nov. 4, 1987

[30] Foreign Application Priority Data

Nov. 10, 1986 [JP] Japan .................. 61-267399

[51] Int. Cl.⁵ .................. G06F 12/00; G06F 13/38
[52] U.S. Cl. .................. 364/200
[58] Field of Search ... 364/200 MS File, 900 MS File; 371/25

[56] References Cited

U.S. PATENT DOCUMENTS

| | | | |
|---|---|---|---|
| 4,514,805 | 4/1985 | McDonough et al. | 364/200 |
| 4,631,665 | 12/1986 | Yokouchi | 364/200 |
| 4,636,945 | 1/1987 | Tanagawa et al. | 364/200 |
| 4,670,838 | 6/1987 | Kawata | 364/200 |
| 4,688,222 | 8/1987 | Blum | 371/25 |
| 4,739,475 | 4/1988 | Mensch, Jr. | 364/200 |
| 4,763,248 | 8/1988 | Kitada | 364/200 |
| 4,777,586 | 10/1988 | Matsubara et al. | 364/200 |
| 4,780,819 | 10/1988 | Kashiwagi | 364/200 |
| 4,788,683 | 11/1988 | Hester et al. | 371/25 |

FOREIGN PATENT DOCUMENTS

| | | |
|---|---|---|
| 55110349 | 1/1984 | Japan . |
| 60-61841 | 4/1985 | Japan . |
| 60-134350 | 7/1985 | Japan . |
| 60-209852 | 10/1985 | Japan . |
| 0045336 | 3/1986 | Japan . |
| 0045338 | 3/1986 | Japan . |
| 0045351 | 3/1986 | Japan . |
| 0067147 | 4/1986 | Japan . |
| 0233846 | 10/1986 | Japan . |

Primary Examiner—Andrew J. James
Assistant Examiner—Viet Q. Nguyen
Attorney, Agent, or Firm—Spencer & Frank

[57] ABSTRACT

In an evaluation single-chip microcomputer which includes circuit elements connected to an internal bus and capable of storing data or of arithmetic operation, the contents of the circuit elements being required to be known outside of the microcomputer, a control circuit decodes instructions supplied through the internal bus and produces control signals for controlling the operations of the circuit elements, the data written in each of the circuit elements is transmitted to the internal bus during execution of any one of instructions involving transfer of data into the circuit element, and output terminals are provided for outputting part of the control signals from the control circuit and part of the output signals from the circuit elements through the internal bus, the control signals including write control signals for writing data in the circuit elements.

17 Claims, 4 Drawing Sheets

SINGLE-CHIP MICROCOMPUTER

BACKGROUND OF THE INVENTION

The present invention relates to an evaluation single-chip microcomputer used for debugging application programs for a single-chip microcomputer in the process of development of the application programs. A single-chip microcomputer is a microcomputer with a CPU (central processing unit), a storage device, and input/output devices which are all built into a single chip of an integrated circuit.

An example of an evaluation single-chip microcomputer in the prior art is shown in FIG. 1. The illustrated microcomputer 1 comprises an internal bus 2, eight external bus terminals 2a connected to the internal bus 2 for input of instructions, twelve or more address output terminals 3 connected by leads to the inside of the circuit, output terminals 4-1 to 4-5 connected by leads to the internal circuit, a CPU (central processing unit) including an operation section and control section, and a storage unit.

The operation section of the CPU comprises temporary registers (TR1, TR2) 5, 6 for temporarily storing data in accordance with write signals WTR1, WTR2, an ALU (arithmetic logic unit) 7 performing arithmetic operations and logic operations on the outputs of the registers 5, 6. a carry flag register 8 indicating the carry status of the ALU 7, and an accumulator 9 for temporarily storing the result of the operations in accordance with a write signal WACC and providing its contents to the internal bus 2, the temporary register 6 and the output terminals 4-3. The control section of the CPU comprises an instruction register 10 for temporarily storing an instruction supplied through the bus 2 in accordance with a write signal WIR, and a control circuit 11 for decoding the output of the instruction register 10 to produce various control signals including various write signals WTR1, WTR2, WACC, WIR, WM and WD, and increment and decrement signals PC+1, D+1 and D−1. The output of the instruction register 10 is also supplied to the external terminals 4-4.

The storage unit comprises a data memory 12 in the form of a read/write memory (RAM) which stores data in accordance with the write signal WM and produces its contents onto the bus 2 and the output terminal 4-2, and a program memory 13 in the form of a read-only memory (ROM) which stores programs and produces its contents onto the bus 2 and the output terminals 4-5. The addresses of the memories 12 and 13 are given from a data pointer 14 and a program counter (PC) 15, respectively. That is, the data pointer 14 is a register which stores an address of the data memory 12 in which the data should be written next or from which the data should be read next. The data pointer 14 stores the data (address) from the bus 2 in accordance with the write signal WD. The data pointer 14 also increments or decrements its content in accordance with the increment signal D+1 or decrement signal D−1. The output of the data pointer 14 is supplied to the data memory 12 and the output terminal 4-1. The program counter 15 is a register which stores an address of the program memory 13 from which an instruction should be read. The program counter 15 increments its content by 1 each time an increment signal PC+1 is applied from the control circuit 11. The output of the program counter 15 is supplied to the program memory 13 and the address output terminal 3. An essential distinction of the above described evaluation microcomputer from an ordinary microcomputer is the provision of output terminals 4-1 to 4-5 through which various signals can be output to external circuitry used for the evaluation tests.

When debugging of the application program to be evaluated is carried out using the evaluation microcomputer described above, an external memory 20 in the form of a ROM storing the application program is connected to the external bus terminals 2a and the address output terminals 3. The program is performed and whether the microcomputer operates as desired is tested by examining the various data as output through the output terminals.

For instance, when an instruction of the application program for transferring the content of the accumulator 9 to the data pointer 14 is to be executed, the instruction is read from the external memory 20 onto the internal bus 2, and the instruction on the internal bus 2 is written in the instruction register 10 in accordance with the write signal WIR. Since the content of the instruction register 10 is output through the output terminals 4-4, it can be examined outside of the microcomputer I. Next, the content of the instruction register 10 is decoded at the control circuit 11, from which the increment signal PC+1 is supplied to the program counter 15. The program counter 15 then supplies the next address to the external memory 20 and causes the content to be output onto the internal bus 2. The instruction on the internal bus 2 is again stored in the instruction register 10 and decoded at the control circuit 11. In accordance with the signal WACC then produced from the control circuit 11, the content of the accumulator 9 is output to the internal bus 2 and the output terminals 4-3. In accordance with the write signal WD also produced from the control circuit 11, the data on the internal bus 2 is written in the data pointer 14 and the content of the data pointer 14 is output through the output terminals 4-1 to the outside. The content of the data pointer 14 can therefore be examined outside.

The above described microcomputer has the following drawbacks. First a large number of terminals are required, including normally twelve or more address output terminals 3, and normally eight external bus terminals 2a for accessing the external memory 20, and output terminals 4-1 to 4-5 for outputting the contents of the ALU 7, accumulator 9, the instruction register 10, and the memories 12, 13 whose contents need to be examined in real time outside of the microcomputer. The number of the terminals of the evaluation microcomputer is thus much greater than that of the ordinary (mass-produced) microcomputer. For instance, if the registers are of eight bits, 53 or more additional output terminals are required. The package required for encapsulating the evaluation microcomputer needs to be a pin grid array (PGA) array package or other expensive package. Moreover, the area required for the mounting and the number of wirings are large.

In addition, the design pattern of the evaluation microcomputer is much more complicated than the design patterns of the ordinary microcomputer. This is because of the larger number of the terminals and leads connected to them. It is therefore impossible to share the same pattern layout between the evaluation microcomputer and the ordinary microcomputer. That is, it is necessary to make a separate pattern layout design for the evaluation microcomputer. Such a design of course requires much labor and time. Moreover, manufacture of the evaluation microcomputer with the different pattern layout design requires additional labor and time.

SUMMARY OF THE INVENTION

An object of the invention is to reduce the number of terminals of an evaluation single-chip microcomputer.

Another object of the invention is to enable use of simpler and less expensive packages.

A further object is to reduce labor and time required for design and manufacture of the evaluation microcomputer.

A further object of the invention is to provide a real time traceable microcomputer.

According to the invention, there is provided a single-chip microcomputer comprising an internal bus having external bus terminals, circuit elements connected to said internal bus and capable of storing data or of arithmetic operation, the contents of the circuit elements being required to be known outside of the microcomputer, a control circuit decoding instructions supplied through the internal bus and producing control signals for controlling the operations of said circuit elements, means for transmitting the data written in each of said circuit elements, to the internal bus during execution of any one of instructions involving transfer of data into the circuit element, and output terminals for outputting part of the data from the control circuit and part of the output signals from the internal bus, said control signals including write control signals for writing data in said circuit elements.

DETAILED DESCRIPTION OF THE EMBODIMENTS

Figure 1:
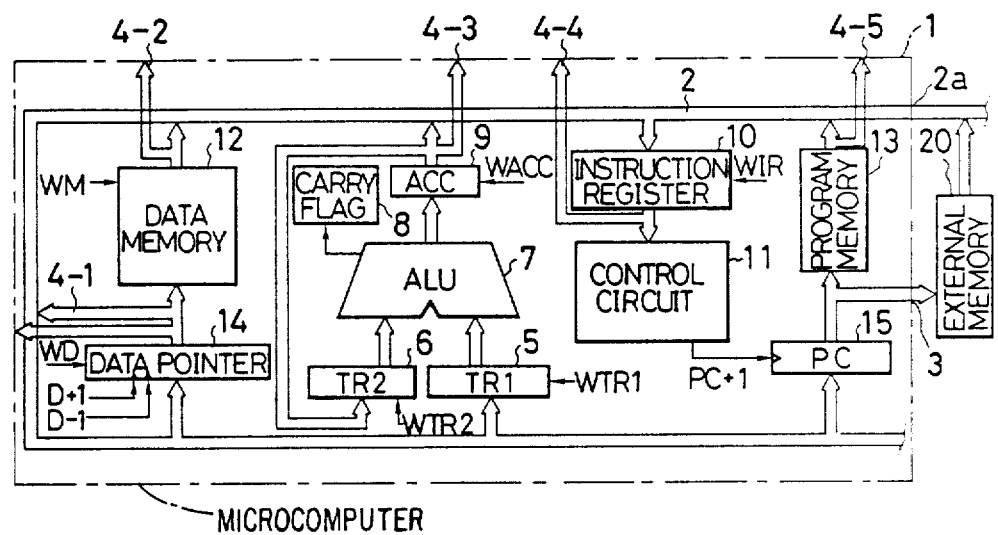
FIG. 1 is a block diagram showing an evaluation microcomputer in the prior art.
Figure 2:
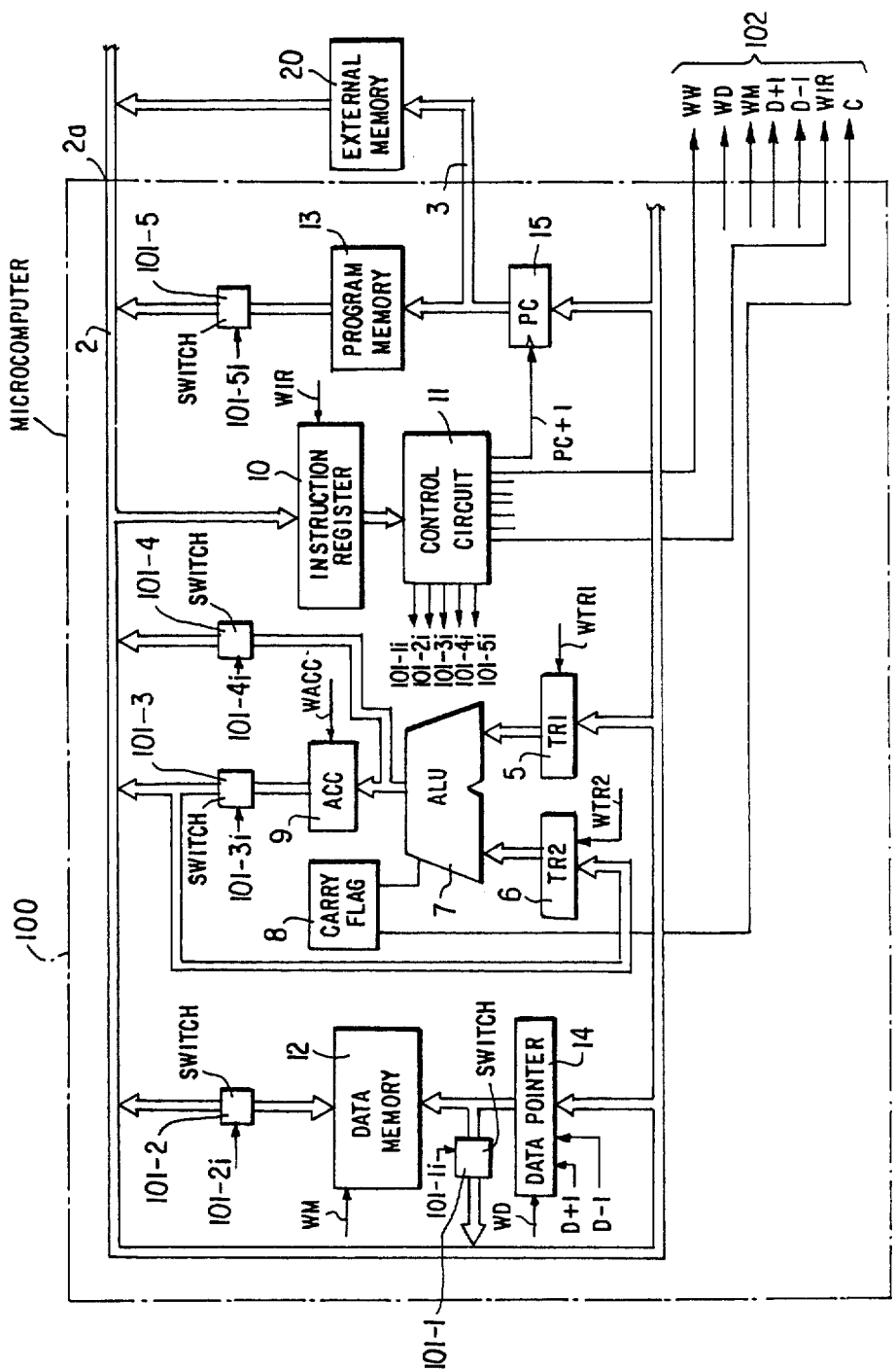
FIG. 2 is a block diagram showing an embodiment of the invention.

FIG. 2 is a block diagram showing an evaluation single-chip microcomputer 100 of an embodiment of the invention. The microcomputer 100 of this embodiment is shown to have the same architecture as the prior art of FIG. 1. This is for facilitating the comparison. The same elements are identified with the same reference marks.

The evaluation single-chip microcomputer 100 of the illustrated embodiment does not have the output terminals 4-1 to 4-5 (FIG. 1) of the prior art arrangement that were connected to the data pointer 14, the data memory 12, the accumulator 9, the instruction register 10, and the program memory 13. The output of the data pointer 14, the input/output of the data memory 12, the output of the accumulator 9, the output of the ALU 7, and the output of the program memory 13 are connected to the internal bus 2 through respective switch units 101-1 to 101-5. The control signals 102 for the registers or the like produced from the control circuit 11, including the write signal WACC for the accumulator 9, the write signal WD for the data pointer 14, the write signal WM for the data memory 12, the write signal WIR for the instruction register 10, and the increment signal D+1 and decrement signal D−1 for the data pointer 14, and the output signal C from the carry flag register 8 are output to the outside of the microcomputer through respective output terminals.

When a test is carried out, registers and memories, corresponding to some of the registers in the microcomputer are provided outside of the microcomputer and connected to receive data and the control signals to store concurrently the same data as their counterparts inside the microcomputer.

The output signal of the instruction register 10 is not supplied to any other register, so that the output terminals of the instruction register 10 are not connected to the internal bus 2.

Instead of outputting the output signal C of the carry flag register 8 directly as shown in FIG. 2, the output of the carry flag register can be connected via a switch to one of the lines of the internal bus 2. But the illustrated arrangement is advantageous since the output signal C of the carry flag register 8 consists of a single bit.

Figure 3:
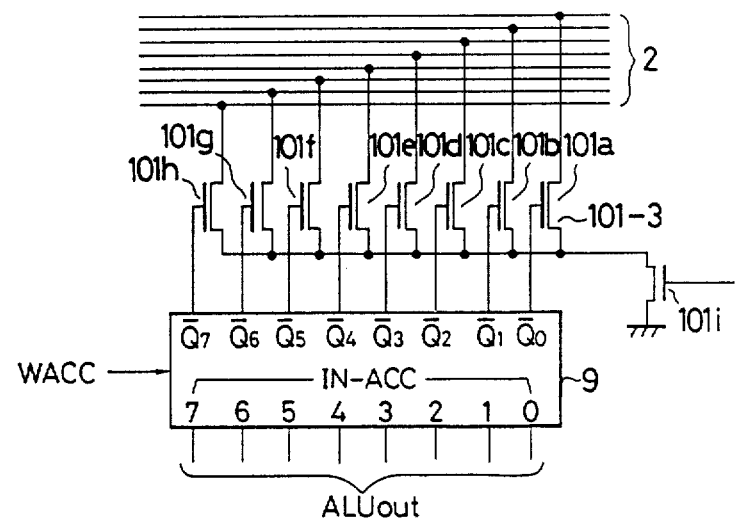
FIG. 3 is a block diagram showing an example of switch section.

FIG. 3 shows an example of switch unit 101-3 connecting the output of the accumulator 9 to the internal bus 2. The switch unit comprises eight n-channel MOS transistors 101a to 101h having their drains connected to respective lines of the internal bus 2 and having their sources connected together to the drain of another n-channel MOS transistor 101i, of which the source is grounded. The gates of the MOS transistors 101a to 101h are connected to the output terminals $\overline{Q_0}$ to $\overline{Q_7}$. The MOS transistor 101i is turned on and off by an output of the control circuit 11. Eight input terminals (IN) 0, 1, ... 7 of the accumulator 9 are connected to the output terminals (ALU$_{OUT}$) of the ALU 7. Other switch units 101-1, 101-2, 101-4 and 101-5 are similarly constructed.

Figure 5:
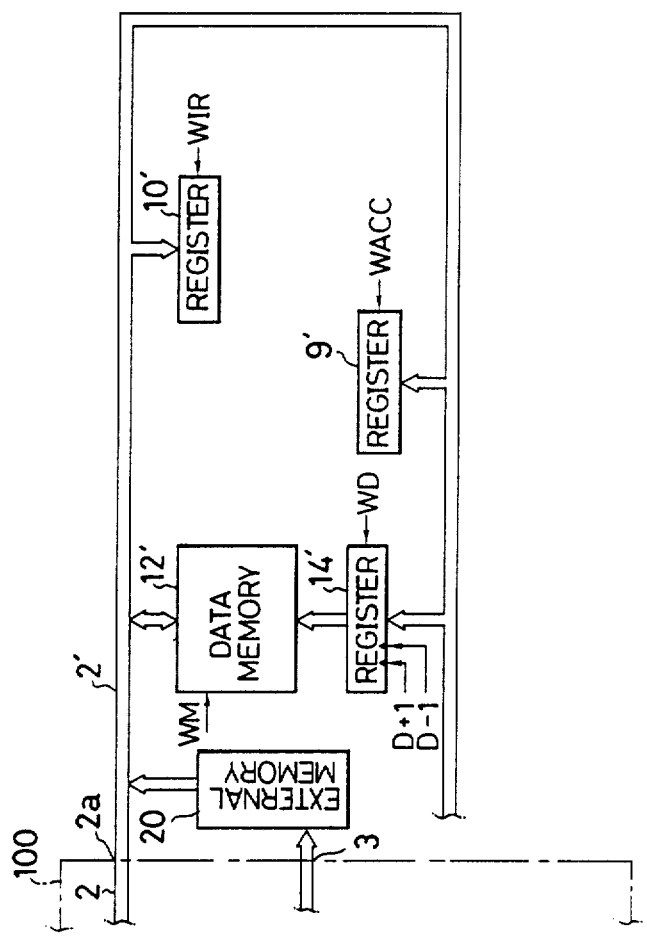
FIG. 5 is a block diagram showing "shadow" circuit elements used for the evaluation.

For examining the operations of the microcomputer 100 by causing it to execute an application program stored in an external memory 20, the external memory 20 is connected to the external bus terminals 2a and the address output terminals 3. Furthermore registers and a data memory corresponding to the registers and the like (9, 10 and 14) and the data memory 12 inside the microcomputer are also connected to hold the same data as the corresponding resisters and the data memory inside the microcomputer. An example of the connection of the registers and memories outside the microcomputer is shown in FIG. 5. Here the components are identified by the same reference numerals as the corresponding components inside the microcomputer, but with a prime (′) added. Such components can be called "shadow components."

Figure 4A:
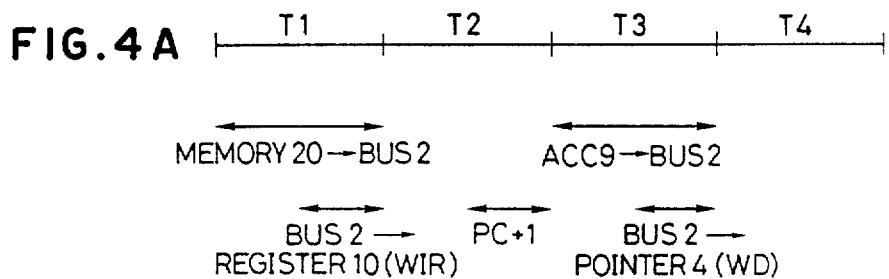
FIGS. 4A to 4C are timing charts showing the operations of instructions.
Figure 4B:
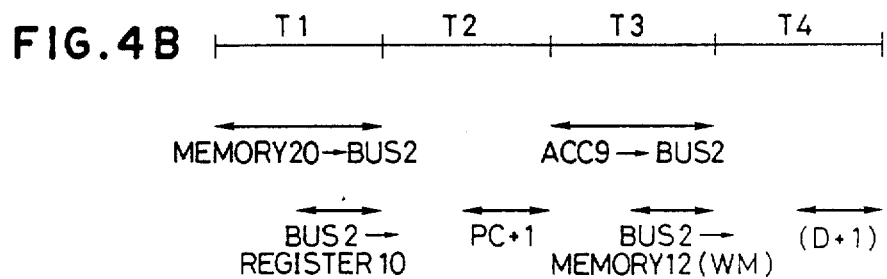
Figure 4C:
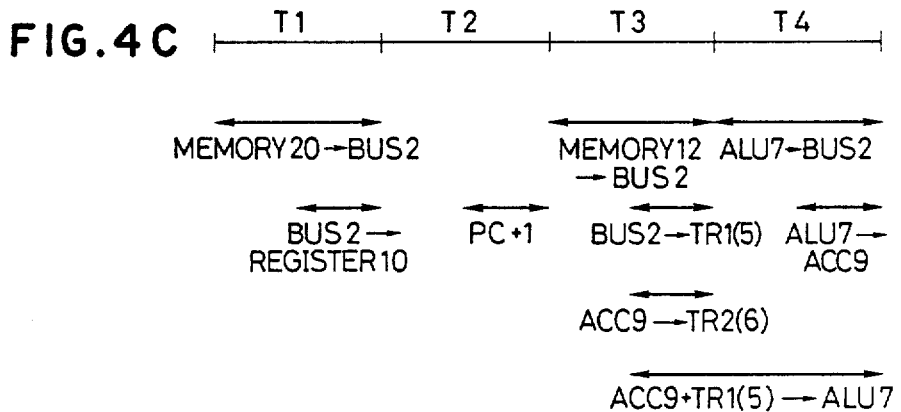

FIGS. 4A, 4B and 4C show examples of timings of execution of instructions by the microcomputer shown in FIG. 2. FIG. 4A shows execution of an instruction for transferring the content of the accumulator 9 to the data pointer 14. FIG. 4B shows execution of an instruction for storing the content of the accumulator 9 in the data memory 12 and incrementing by one the content of the data pointer 14. FIG. 4C shows execution of an instruction for adding, at the ALU 7, the content of the data memory 12 to the content of the accumulator 9 and writing the result of the addition in the accumulator 9.

Execution of the instruction shown in FIG. 4A

At a state T1, the instruction from the external memory 20 is read through the external bus 2′ and the external bus terminals 2a onto the internal bus 2 and is written in the instruction register 10 in accordance with the write signal WIR produced from the control signal 11. Concurrently with the operation inside the microcomputer, the data on the external bus 2' is latched into the register 10' in accordance with the write signal WIR. The content of the instruction register 10 is thus reflected in the register 10' and is known outside the microcomputer.

At a state T2, the signal PC+1 is supplied from the control circuit 11 to the program counter 15 to increment the content of the program counter 15.

At a state T3, the content of the accumulator 9 is supplied to the internal bus 2 through the switch unit 101-3 controlled by the output of the control circuit 11, and is written in the data pointer 14 in accordance with the write signal WD. Concurrently therewith, the data on the external bus 2' is latched in the register 14' in accordance with the write signal WD. The content of the data pointer 14 is thus known outside the microcomputer.

Execution of the instruction shown in FIG. 4B

The operations during the states T1 and T2 are identical to those described above with reference to FIG. 4A. At a state T3, the content of the accumulator 9 is supplied onto the internal bus 2 through the switch unit 101-3 and written in the address of the data memory 12 that is being designated by the data pointer 14, in accordance with the write signal WM produced from the control circuit 11. Concurrently, the data on the external bus 2' is written in a corresponding address of the memory 12' in accordance with the write signal WM. The data that has been written in the data memory 12 is also written in the outside data memory 12' and is hence known outside the microcomputer.

At a state T4, an increment signal D+1 is supplied from the control circuit 11 to the data pointer 14, whose content is thereby incremented by "1". Concurrently, the increment signal D+1 is also supplied to a register (comprising a counter IC or the like) 14', whose content is thereby incremented by "1". At this state T4, the data on the internal bus 2 is not required both inside and outside the microcomputer.

Execution of the instruction shown in FIG. 4C

The operations in the states T1 and T2 are similar to those shown in FIG. 4A. At a state T3, the content of the data memory 12 is output to the internal bus 2 through the switch unit 101-2 controlled by the control circuit 11. The data on the internal bus 2 is then written in the temporary register (TR1) 5 in accordance with the write signal WTR1 which is an output of the control circuit 11. Concurrently, the content of the accumulator 9 is written in the temporary register (TR2) 6 in accordance with the write signal WTR2 which is also produced from the control circuit 11. As a result, the ALU 7 adds the two data from the temporary registers 5, 6 and outputs the result of the addition. In the state T4, the output of the ALU 7 is transmitted to the internal bus 2 through the switch unit 101-4 controlled by the control circuit 11. The output of the ALU 7 is written in the accumulator 9 in accordance with the write signal WACC. In accordance with the same write signal WACC, the data on the external bus 2' is written in a corresponding register 9'. The content of the accumulator 9 is therefore known outside by reference to the register 9'.

Incidentally, the temporary registers 5, 6 temporarily store data on which operations are to be performed. Examination of their contents is not necessary for the test. Accordingly, they are not connected to the internal bus 2 and no corresponding registers are provided outside the microcomputer.

The above embodiment has the following advantages: The outputs of the registers and the like are connected through the switch units 101-1 to 101-5 to the internal bus 2, and the signals 102 such as the write signals for the registers and the like are output through the output terminals, and using these signals the data on the internal bus 2 are written through the external bus 2' into the corresponding one of the registers and the like. The contents of the registers and the like inside the microcomputer are thereby reflected in the corresponding registers and the like outside the microcomputer.

The number of output terminals required is much smaller than in the arrangement of the prior art shown in FIG. 1. For instance, the output terminals required are eight external bus terminals 2a, twelve address output terminals 3, and seven output terminals for the signals 102, which make a total of 27. This compares with 53 output terminals in the prior art arrangement shown in FIG. 1. The reduction in the number of the required output terminals becomes more significant as the number of registers and the like whose contents should be reflected outside the microcomputer is increased. Because of the reduction in the number of output terminals, pin grid array package need not be employed and a less expensive package can be used.

The invention requires that the registers whose contents should be reflected in the outside shadow registers be connected to the internal bus 2. But the registers are mostly connected to the internal bus 2 irrespective of the incorporation of the feature of the invention. Special connections to be added for implementing the invention are few and do not cause a substantial increase of the space for wiring or other additional hardware. In other words, the IC chip designed for the evaluation microcomputer according to the invention can be almost of the same size as an IC chip designed specifically for the ordinary microcomputer without the function of evaluation. Accordingly, the IC chip designed for the evaluation microcomputer can also be used for the ordinary microcomputer. This obviates the necessity of separate pattern layout designs, and separate fabrication steps.

In the above embodiment the content of the program counter is output through the address output terminals 3. Alternatively, the output of the program counter 15 can be connected via a switch unit to the internal bus 2. This will obviate the need for the separate address output terminals 3. As another alternative, a shadow counter corresponding to the counter 15 can be provided outside the microcomputer. In this case the increment signal PC+1 should be applied to the shadow counter 15. This requires only a single output terminal.

What is claimed is:

1. A method of evaluating a single-chip microcomputer, comprising the steps of:
   (a) providing an evaluation single-chip microcomputer which includes
      an internal bus having external bus terminals,
      circuit elements for connection to said internal bus and capable of storing data or or arithmetic operation, the contents of the circuit elements being required to be known outside of the microcomputer, a control circuit means for decoding instructions supplied through the internal bus and producing control signals for controlling the operations of said circuit elements, means, responsive to the control signals from the control circuit means, for selectively connecting said circuit elements to the internal bus during execution of predetermined instructions, and output terminals for outputting at least part of the control signals from the control circuit means, said control signals including write control signals for writing data into said circuit elements, (b) providing, outside the microcomputer, shadow circuit elements corresponding to the circuit elements inside the microcomputer whose contents should be examined for the evaluation, (c) providing, outside the microcomputer, an external memory storing a program to be evaluated, (d) connecting the output of the external memory to the external bus terminals, (e) connecting the shadow circuit elements to receive data from the external bus terminals and to receive control signals, (f) causing the program stored in the external memory to be executed, and (g) indirectly observing and tracing in real time the contents of the circuit elements inside the microcomputer by reference to the corresponding shadow circuit elements.

2. A method according to claim 1, wherein step (e) is conducted so that a write control signal is applied to a shadow circuit element for writing data into the respective shadow circuit element from the external bus terminals when the content of a corresponding circuit element inside the microcomputer is on the internal bus.

3. A method according to claim 1, wherein step (e) is conducted so that a write control signal is applied to a shadow circuit element for writing data into the respective shadow circuit element from the external bus terminals when a write control signal for writing data in a corresponding circuit element inside the microcomputer is produced.

4. A method according to claim 1, wherein step (a) further comprises providing an evaluation single-chip microcomputer which additionally includes a program counter and additional output terminals for outputting the content of the program counter, and wherein step (f) comprises connecting the additional output terminals to the external memory.

5. An evaluation single-chip microcomputer, comprising an internal bus having external bus terminals, circuit elements for connection to said internal bus and capable of storing data or of arithmetic operation, the contents of the circuit elements being required to be known outside of the microcomputer, a control circuit means for decoding instructions supplied through the internal bus and producing control signal for controlling the operations of said circuit elements, means, responsive to the control signals from the control circuit means, for selectively connecting said circuit elements to the internal bus during execution of predetermined instructions, and output terminals for outputting at least part of the control signals from the control circuit means, said control signals including write control signals for writing data into said circuit elements, wherein, during evaluation, said control circuit means receives instructions from outside of the microcomputer, wherein said microcomputer further comprises a program memory to store a program, wherein said means for selectively connecting includes means for transmitting instructions from the program memory to the internal bus when a program stored in the program memory is to be executed, and wherein said control circuit means prevents said means for transmitting instructions from transmitting instructions from said program memory during evaluation.

6. A single-chip microcomputer, comprising:

an internal bus having at least one external bus terminal;

a plurality of circuit elements, one of the circuit elements being a data memory having a control signal input port;

means for selectively coupling the circuit elements to the bus;

control circuit means for decoding instructions supplied through the bus and producing a plurality of control signals for controlling the operations of the circuit elements, one of the control signals being a write control signal which is applied to the control signal input port of the data memory; and an external output terminal which is connected to the control circuit means and which receives the write control signal when the control signal input port of the data memory receives the write control signal.

7. The microcomputer of claim 6, wherein one of the circuit elements is an accumulator having a control signal input port, wherein one of the control signals produced by the control circuit means is an additional write control signal which is applied to the control signal input port of the accumulator, and further comprising an additional external output terminal which is connected to the control circuit means and which carries the additional write control signal.

8. The microcomputer of claim 6, wherein one of the circuit elements is an instruction register having a control signal input port, wherein one of the control signals produced by the control circuit means is another write control signal which is applied to the control signal input port of the instruction register, and further comprising another external output terminal which is connected to the control circuit means and which carries the another write control signal.

9. The microcomputer of claim 6, wherein one of the circuit elements is a data pointer having first, second, and third control signal input ports, wherein among the control signals produced by the control circuit means are first, second, and third control signals which are applied respectively to the first, second, and third input ports of the data pointer, and further comprising external first, second, and third data pointer output terminals which are connected to the control circuit means and which respectively carry the first, second, and third control signals.

10. The microcomputer of claim 9, wherein the first control signal is a write control signal, wherein the second control signal is an increment signal, and wherein the third control signal is a decrement signal.

11. The microcomputer of claim 6, wherein one of the circuit elements is an ALU, and further comprising a carry flag connected to the ALU, and an external carry flag register output terminal connected to the carry flag register.

12. A single-chip microcomputer, comprising:

an internal bus having at least one external bus terminal;

a plurality of circuit elements, one of the circuit elements being an accumulator having a control signal input port;

means for selectively coupling the circuit elements to the bus;

control circuit means for decoding instructions supplied through the bus and producing a plurality of control signals for controlling the operations of the circuit elements, one of the control signals being a write control signal which is applied to the control signal input port of the accumulator; and an external output terminal which is connected to the control circuit means and which receives the write control signal when the control signal input port of the accumulator receives the write control signal.

13. The microcomputer of claim 12, wherein one of the circuit elements is a data memory having a control signal input port, wherein one of the control signals produced by the control circuit means is an additional write control signal which is applied to the control signal input port of the data memory, and further comprising an additional external output terminal which is connected to the control circuit means and which carries the additional write control signal.

14. The microcomputer of claim 12, wherein one of the circuit elements is an instruction register having a control signal input port, wherein one of the control signals produced by the control circuit means is another write control signal which is applied to the control signal input port of the instruction register, and further comprising another external output terminal which is connected to the control circuit means and which carries the another write control signal.

15. The microcomputer of claim 12, wherein one of the circuit elements is a data pointer having first, second, and third control signal input ports, wherein among the control signals produced by the control circuit means are first, second, and third control signals which are applied respectively to the first, second, and third input ports of the data pointer, and further comprising external first, second, and third data pointer output terminals which are connected to the control circuit means and which respectively carry the first, second, and third control signals.

16. The microcomputer of claim 15, wherein the first control signal is a write control signal, wherein the second control signal is an increment signal, and wherein the third control signal is a decrement signal.

17. The microcomputer of claim 12, wherein one of the circuit elements is an ALU, and further comprising a carry flag register connected to the ALU, and an external carry flag output terminal connected to the carry flag register.

* * * * *